US006982119B2

(12) United States Patent
Shi et al.

(10) Patent No.: US 6,982,119 B2
(45) Date of Patent: Jan. 3, 2006

(54) COATING COMPOSITION CONTAINING AN EPOXIDE ADDITIVE AND STRUCTURES COATED THEREWITH

(75) Inventors: Yu Shi, Alpharetta, GA (US); Lawrence S. Mucha, Roswell, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/408,379

(22) Filed: Apr. 7, 2003

(65) Prior Publication Data

US 2003/0219556 A1 Nov. 27, 2003

Related U.S. Application Data

(60) Provisional application No. 60/372,484, filed on Apr. 15, 2002.

(51) Int. Cl.
 B32B 27/38 (2006.01)
(52) U.S. Cl. ............... 428/413; 428/500; 428/521; 428/532; 428/423.1; 427/386; 427/393.5
(58) Field of Classification Search ........... 428/413, 428/423.1, 500, 521, 532, 36.6, 36.7, 35.6, 428/35.4; 427/386, 393.5
See application file for complete search history.

(56) References Cited

U.S. PATENT DOCUMENTS

| | | | |
|---|---|---|---|
| 2,664,852 A | 1/1954 | Chadsey, Jr. | |
| 2,665,226 A | 1/1954 | Godley, 2nd et al. | |
| 2,830,721 A | 4/1958 | Pinsky et al. | |
| 2,836,318 A | 5/1958 | Pinsky et al. | |
| 2,996,037 A | 8/1961 | Eng | |
| 3,016,873 A | 1/1962 | Baer et al. | |
| 3,511,703 A | 5/1970 | Peterson | |
| 3,625,848 A | 12/1971 | Snapper | |
| 4,230,068 A | 10/1980 | Itoh et al. | |
| 4,438,368 A | 3/1984 | Abe et al. | |
| 4,448,802 A | 5/1984 | Buhl et al. | |
| 4,532,150 A | 7/1985 | Endo et al. | |
| 4,532,196 A | 7/1985 | Yasui et al. | |
| 4,552,791 A | 11/1985 | Hahn | |
| 4,573,429 A | 3/1986 | Cobbs, Jr. et al. | |
| 4,615,916 A | 10/1986 | Henderson | |
| 4,634,605 A | 1/1987 | Wiesmann | |
| 4,689,131 A * | 8/1987 | Roue et al. ............... 204/499 |
| 4,697,974 A | 10/1987 | Eltoukhy | |
| 4,752,426 A | 6/1988 | Cho | |
| 4,765,273 A | 8/1988 | Anderle | |
| 4,824,545 A | 4/1989 | Arnold et al. | |
| 4,849,088 A | 7/1989 | Veltrop et al. | |
| 4,888,199 A | 12/1989 | Felts et al. | |
| 4,902,531 A | 2/1990 | Nakayama et al. | |
| 4,917,786 A | 4/1990 | Ehrich | |
| 4,919,968 A | 4/1990 | Buhl et al. | |
| 4,937,284 A | 6/1990 | Bergström | |
| 4,975,168 A | 12/1990 | Ohno et al. | |
| 5,008,137 A | 4/1991 | Nugent, Jr. et al. | |
| 5,084,356 A | 1/1992 | Deak et al. | |
| 5,085,904 A | 2/1992 | Deak et al. | |
| 5,091,210 A | 2/1992 | Mikoshiba et al. | |
| 5,096,558 A | 3/1992 | Ehrich | |
| 5,112,644 A | 5/1992 | Seddon et al. | |
| 5,126,400 A | 6/1992 | Graiver et al. | |
| 5,215,640 A | 6/1993 | Buhl et al. | |
| 5,230,963 A | 7/1993 | Knoerzer | |
| 5,250,328 A | 10/1993 | Otto | |
| 5,308,649 A | 5/1994 | Babacz | |
| 5,308,950 A | 5/1994 | Ramm et al. | |
| 5,330,831 A | 7/1994 | Knoerzer et al. | |
| 5,364,666 A | 11/1994 | Williams et al. | |
| 5,374,314 A | 12/1994 | Babacz | |
| 5,378,510 A | 1/1995 | Thomas et al. | |
| 5,387,326 A | 2/1995 | Buhl et al. | |
| 5,429,729 A | 7/1995 | Kamei et al. | |
| 5,437,895 A | 8/1995 | Kodama et al. | |
| 5,438,109 A | 8/1995 | Nugent, Jr. et al. | |
| 5,462,779 A | 10/1995 | Misiano et al. | |
| 5,468,520 A | 11/1995 | Williams et al. | |
| 5,489,455 A | 2/1996 | Nugent, Jr. et al. | |
| 5,491,204 A | 2/1996 | Nugent, Jr. et al. | |
| 5,510,155 A | 4/1996 | Williams et al. | |
| 5,521,351 A | 5/1996 | Mahoney | |
| 5,531,060 A | 7/1996 | Fayet et al. | |
| 5,558,720 A | 9/1996 | Sarraf et al. | |
| 5,565,248 A | 10/1996 | Plester et al. | |
| 5,573,819 A | 11/1996 | Nugent, Jr. et al. | |
| 5,616,369 A | 4/1997 | Williams et al. | |
| 5,637,365 A | 6/1997 | Carlblom | |
| 5,651,867 A | 7/1997 | Kokaku et al. | |

(Continued)

FOREIGN PATENT DOCUMENTS

DE 1521421 12/1969

(Continued)

OTHER PUBLICATIONS

Abstract, JP 2001-191445, Yamamoto et al., Jul. 2001.*

(Continued)

Primary Examiner—Randy Gulakowski
Assistant Examiner—Christopher Keehan
(74) Attorney, Agent, or Firm—Sutherland Asbill & Brennan LLP (57) ABSTRACT

Coatings are provided to give polymeric structures a top coat that improves the gas barrier properties of the structure while enhancing the water resistance of the top coating and while improving the adhesion of the top coat to an underlying layer of the structure. These top coat compositions comprise an organic barrier coating material in combination with an epoxide additive which enhances the water resistance, adhesion, gas barrier, or a combination thereof, of the top coat barrier layer. Multilayer structures having this top coat are also provided, particularly in the form of containers for food and beverage packaging.

34 Claims, 1 Drawing Sheet

U.S. PATENT DOCUMENTS

| | | | |
|---|---|---|---|
| 5,662,741 A | 9/1997 | Ehrich | |
| 5,670,224 A | 9/1997 | Izu et al. | |
| 5,677,010 A | 10/1997 | Esser et al. | |
| 5,691,007 A | 11/1997 | Montgomery | |
| 5,704,983 A | 1/1998 | Thomas et al. | |
| 5,948,224 A | 9/1999 | Signer, et al. | |
| 6,132,562 A | 10/2000 | Baumecker et al. | |
| 6,162,892 A * | 12/2000 | Kobayashi et al. | 528/310 |
| 6,223,683 B1 | 5/2001 | Plester et al. | |
| 6,276,296 B1 | 8/2001 | Plester | |
| 6,279,505 B1 | 8/2001 | Plester et al. | |
| 6,337,370 B1 | 1/2002 | Bae et al. | |
| 6,352,426 B1 | 3/2002 | Hutchinson et al. | |
| 2001/0022272 A1 | 9/2001 | Plester et al. | |
| 2001/0042510 A1 | 11/2001 | Plester et al. | |
| 2002/0070479 A1 | 6/2002 | Plester | |
| 2003/0012904 A1 | 1/2003 | Hutchinson et al. | |

FOREIGN PATENT DOCUMENTS

| | | |
|---|---|---|
| DE | 3239131 A1 | 4/1984 |
| DE | 4026494 C2 | 5/1992 |
| DE | 42 03 371 C1 | 2/1993 |
| DE | 40 06 457 C2 | 9/1993 |
| DE | 4305721 C1 | 7/1994 |
| DE | 4343042 C1 | 3/1995 |
| DE | 4412906 C1 | 7/1995 |
| DE | 196 00 993 A1 | 8/1996 |
| DE | 44 44 763 C2 | 11/1996 |
| DE | 195 46 827 A1 | 6/1997 |
| EP | 0 460 796 A2 | 4/1991 |
| EP | 0 460 796 B1 | 4/1991 |
| EP | 0 535 810 A1 | 9/1992 |
| EP | 0 438 627 B1 | 5/1995 |
| EP | 0 785 291 A1 | 7/1997 |
| EP | 0 0550 039 B1 | 3/1998 |
| GB | 2 139 647 A | 11/1984 |
| GB | 2 263 472 A | 1/1992 |
| JP | 57169088 | 10/1982 |
| JP | 61104075 | 5/1986 |
| JP | 63243264 | 10/1988 |
| JP | 63312968 | 12/1988 |
| JP | 02118064 | 5/1990 |
| JP | 04345841 A | 12/1992 |
| JP | 06128533 A | 5/1994 |
| JP | 08092764 | 4/1996 |
| JP | 2000103993 A | 4/2000 |
| JP | 2001-191445 * | 7/2001 |
| WO | WO 92/12275 | 7/1992 |
| WO | WO 92/03841 | 2/1993 |
| WO | WO 96/27495 | 12/1996 |
| WO | WO 98/40531 | 9/1998 |
| WO | WO-02/16484 | 8/2000 |
| WO | WO 02/16484 | 2/2002 |

OTHER PUBLICATIONS

G.I. Deak & S.C. Jackson: *Mylar Polyester Films With Inorganic Glass Coatings*; Du Pont Company, Wilmington, DE, pp. 318-323.

Glass & Winkler, "New Thermoplastic Adhesive and Barrier Resins", ANTEC 2000, pp. 1813-1817.

BLOX 0000 and 40000 Series, Product Information, Dow Plastics (Form No. 296-01412-800X SMG), published Aug. 2000.

Product No. 440167, Product Name 3-Glycidoxypropyltrimethoxysilane, 98% http://www.sigma-aldrich.com/sacatalog.nsf/productlookup/Aldrich440167 (Jan. 7, 2002).

Product No. 440140, Product Name 3-Aminopropyltriethoxysilane, 99% http://www.sigma-aldrich.com/sacatalog.nsf/productlookup/Aldrich440140 (Jan. 7, 2002).

* cited by examiner

COATING COMPOSITION CONTAINING AN EPOXIDE ADDITIVE AND STRUCTURES COATED THEREWITH

CROSS-REFERENCE TO RELATED APPLICATIONS

Priority is claims under 35 U.S.C. § 119 to U.S. provisional application Ser. No. 60/372,484, filed Apr. 15, 2002.

TECHNICAL FIELD

This invention relates to plastic films and containers, such as beverage containers, that include a barrier coating to reduce gas permeation therethrough, and more particularly to top coat materials for enhancing the performance properties of the barrier coating.

BACKGROUND OF THE INVENTION

Plastic containers comprise a large and growing segment of the food and beverage industry. Plastic containers offer a number of advantages over traditional metal and glass containers. They are lightweight, inexpensive, non-breakable, transparent, and easily manufactured and handled. Plastic containers have, however, at least one significant drawback that has limited their universal acceptance, especially in the more demanding food applications. That drawback is that all plastic containers are more or less permeable to water, oxygen, carbon dioxide, and other gases and vapors. In a number of applications, the permeation rates of affordable plastics are great enough to significantly limit the shelf life of the contained food or beverage, or prevent the use of plastic containers altogether.

Plastic bottles have been constructed from various polymers, predominantly PET, for non-carbonated and particularly for carbonated beverages. All of these polymers, however, exhibit various degrees of permeability to gases and vapors, which have limited the shelf life of the beverages contained within them. For example, carbonated beverage bottles have a shelf life that is limited by loss of $CO_2$. (Shelf life is typically defined as the time needed for a loss of seventeen percent of the initial carbonation of a beverage.) For non-carbonated beverages, similar limitations apply due to oxygen and/or water vapor diffusion. Diffusion means both ingress and egress (diffusion and infusion) to and from the bottle or container. It would be desirable to have a container with improved gas barrier properties.

A number of technologies have been developed to decrease the permeability of polymers, and thus increase their range of applicability to food and beverage packaging. (Permeability decrease is equivalent to barrier increase.) One of the most promising approaches has been the deposition of thin layers of inorganic oxides on the surface of the polymers, either before or after mechanically forming the polymer into the finished container. See, e.g., PCT WO 98/40531. Inorganic oxides, especially silicon dioxide, have been explored extensively, because of their transparency, impermeability, chemical inertness, and compatibility with food and beverages. Commercialization of containers based on polymeric/inorganic oxide multilayer structures, however, has been slow and mostly limited to flexible containers made by post-forming coated films.

In particular, rigid polymeric containers with inorganic oxide coatings have proven difficult to develop. Despite the relative ease of depositing inorganic oxides onto the exterior surface of a rigid container, those containers have not exhibited sufficient reductions in permeability over the uncoated containers. This modest decrease in permeability is due to the presence of residual pinholes in the inorganic oxide layer. Pinholes are created, in part, by pressurization of containers—such as when containers hold carbonated beverages. The surface area occupied by these pinholes is usually quite small (on the order of less that 1% of the total surface); however, the impact of these pinholes is far greater than their surface area would suggest, because diffusion through a polymer occurs in all three spatial dimensions. Each pinhole therefore can drain a much larger effective area of the container surface than the actual area of the pinhole.

Several methods have been explored to address the pinhole problem. The most common approach has been to deposit thicker layers of the oxide; however, this approach is inherently self-defeating. Thicker layers are less flexible and less extensible than thin layers, and therefore more prone to fracturing under stress. Another method is to apply multiple layers of inorganic oxides, sometimes with intermediate processing to redistribute the pinhole-causing species. This approach also has met with little success, in part, because of the greater complexity of the process and because of its modest improvement in barrier performance. A third method has been to supply an organic sub-layer on the polymer surface to planarize the surface and cover up the pinhole-causing species prior to laying down the inorganic oxide. This method also greatly increases the complexity and cost of the overall process, with only modest improvement in barrier performance. A fourth approach has been to melt-extrude a second polymer layer on top of the inorganic oxide layer, in order to provide additional resistance to gas flow through the pinholes.

With this fourth approach, it has been reported that applying a 4 micron layer of poly(ethylene-co-vinyl acetate) on top of a PET/$SiO_x$ structure improved the barrier property by 3x, and applying a 23 micron top layer of PET improved the barrier performance by 7x (Deak & Jackson, Society of Vacuum Coaters, 36$^{th}$ Annual Technical Conference Proceedings, p. 318 (1993)). Despite this barrier improvement, there has been little commercial implementation of this approach, for several reasons. First, melt extrusion of a second polymer onto a polymeric/inorganic oxide film imparts substantial thermal stress to the preformed structures, often severely compromising their barrier performance. Second, structures with two different polymers are inherently more difficult to recycle than structures composed of only one polymer. Third, co-extrusion of a second polymer onto preformed rigid containers is nearly impossible with current technology and is cost prohibitive for large volume applications in the food and beverage industry.

Yet another method has been fully explored to address this problem and has achieved promising results in barrier improvement. This method applies onto the inorganic oxide layer a top coat comprised of soluble organic compounds having a plurality of carboxyl, hydroxyl, or carboxamide functional groups. See, e.g., PCT WO 02/16484. This top coat blocks ingress or egress of gas or vapor through the pinholes and achieves a barrier improvement of 5 to 10 times or more, and improves the abrasion resistance of bottles coated with an inorganic oxide. One problem with these compounds, however, is their inherent water solubility. The top coat thus has a less than optimum water resistance. Some of the soluble compounds also do not adhere effectively to the inorganic oxide coating surface. It therefore would be advantageous to reduce or eliminate the problem of gas or vapor permeability through pinholes in the inorganic oxide layer of a multi-layered structure by providing a top coat layer that has improved adhesion to the inorganic oxide layers, good water resistance, and enhanced barrier performance.

Others have used UV-cured acrylic oligomers, organic solvent based epoxy-amine cured polymers, or halogenated organic formulations (e.g., polyvinylidene chloride) as barrier coatings or protective films for PET substrate/silica constructions. It would be highly preferable to achieve the barrier and coating performance requirements described above with a water-based, essentially 100% VOC-free, and halogen-free coating composition.

It would therefore be desirable to provide barrier coated plastic structures having enhanced gas barrier properties and improved water resistance, particularly where the top coat exhibits good adherence to the underlying structure. It would also be desirable to provide compositions and methods for improved adhesion of a top coat barrier layer to a polymeric base layer or to an inorganic oxide layer, wherein the top coat fills any pinholes in the inorganic oxide layer and reduces the gas permeability of the multilayer structure. It would be further desirable to provide barrier coatings and methods that are water-based and substantially or completely free of volatile organic solvents and halogens.

SUMMARY OF THE INVENTION

Compositions and methods are provided to give polymeric structures a top coat that improves the gas barrier properties of the structure, while enhancing the water resistance of the top coating, and while improving the adhesion of the top coat to the underlying layer. These top coat compositions include an organic compound (barrier material) in combination with an epoxide additive that reacts with (e.g., crosslinks) the organic compound. The organic compound preferably is a water-soluble polymer, water-dispersible polymer, or aqueous emulsion polymer. Layered structures having this top coat are also provided, particularly in the form of containers for food and beverage packaging.

Containers employing the top coat meet the demanding requirements of most commercial applications. The containers demonstrate substantial water rinse resistance immediately after the top coat is dried, and coatings and bottles made with these coatings remain clear and adherent after more than 24 hours of soaking in room temperature water. Bottles having the coated structures described herein can provide a BIF of two or more, preferably five or more in the case of top coat on inorganic coating layer, even after abuse testing. For recycling purposes, the coatings can be removed during exposure to water at 80° C. at pH 12 or less. The coatings feel like PET plastic after water soak and are not slippery. They also can accept printing and adhesives, and provide improved gloss on the containers. The coatings also possess good film mechanical properties to provide resistance to container handling abuse.

In preferred embodiments, the polymeric base layer is a thermoplastic polymer, particularly a polyester, such as polyethylene terephthalate (PET). The top coat comprises an organic compound capable of reducing the permeability of the gas barrier layer to gas or vapor, and an epoxide additive, which may cross-link the organic compound and/or which may react with neutralization agents in aqueous coating solutions. Desirably, the organic compound is polymeric. The organic compound preferably has a plurality of hydroxyl, carboxyl, amine, or carbonyl functional groups. Preferred organic compounds include polyvinyl alcohols and polyhydroxyaminoethers. The epoxide additive desirably undergoes a ring opening reaction with a functional group of the organic compound. Examples of suitable epoxide additives include, but are not limited to, resorcinol diglycidyl ether and glycerol diglycidyl ether.

In another aspect, methods are provided for reducing the permeability of vapor or gas though a polymeric structure comprising a polymeric base layer. The method steps include (i) applying to the polymeric base layer a solution, dispersion, or emulsion comprising an organic compound capable of reducing the permeability of the structure to gas or vapor, and an epoxide additive, to form a wet coating, and (ii) drying the wet coating, and reacting the epoxide additive, to form a top coat barrier layer on the structure. Optionally, an inorganic oxide barrier layer (e.g., a $SiO_x$ coating) can be applied onto the polymeric base layer before applying the solution, dispersion, or emulsion to the polymeric base layer. This results in a multilayer structure with an inorganic oxide layer interposed between the polymer base layer and the top coat barrier layer.

The top coat solution, dispersion, or emulsion preferably is aqueous, and more preferably is substantially free of halogenated compounds and volatile organic solvents. The solution, dispersion, or emulsion typically is applied to the polymeric base layer or to the inorganic oxide barrier layer by using a spray coating, flowing, or dip coating technique. The drying and reacting preferably are conducted at a temperature less than or equal to about 75° C.

In yet another aspect, methods are provided for packaging products, particularly foods and beverages. In a method of packaging a beverage, the steps include (i) providing a container comprising a polymeric container body; (ii) applying to an exterior surface of the polymeric container body a top coat comprising an organic compound capable of reducing the permeability of the container body to gas or vapor, and an epoxide additive; and (iii) depositing a beverage in the container. Such beverages desirably may be a carbonated beverage, such as a soft drink or beer, or a non-carbonated beverage, such as water or a juice-containing beverage.

DETAILED DESCRIPTION OF THE INVENTION

A coated structure is provided which comprises a polymeric base layer, optionally an inorganic gas barrier layer on the surface of the polymeric base layer, and an improved top coat on the polymeric base layer or on the inorganic gas barrier layer. The top coat comprises an organic compound capable of reducing the permeability of the structure to gas or vapor, and an epoxide additive which enhances the water resistance, adhesion, gas barrier, or a combination thereof, of the top coat barrier layer, thereby providing a top coat with enhanced adhesion and/or improved water resistance. The top coat is particularly suitable for blocking ingress or egress of oxygen and carbon dioxide through polymeric packaging containers.

Composition for Forming the Top Coat

The coating compositions used for forming the top coat layer described herein preferably are provided as a solution, dispersion, or emulsion containing (i) an organic compound that provides a gas and vapor barrier, and (ii) an epoxide additive dispersed/dissolved therein which enhances the water resistance, the adhesion (i.e., promotion of adhesion to a polymeric base layer or to an intermediate inorganic barrier layer), the gas barrier, or a combination thereof, of the top coat barrier layer. The solution, dispersion, or emulsion, which is preferably aqueous-based, must be capable of forming a continuous film upon drying.

In a particularly preferred embodiment, the aqueous solution, dispersion, or emulsion is at least substantially free of both volatile organic compounds (VOCs) and halogen compounds. As used herein, the term "at least substantially free" means in the case of a dispersion or emulsion that it contains no or only very low amounts of VOCs (i.e., less than 2% by weight VOCs) and in the case of a solution that it contains no or very low amounts of a low toxic organic solvent (i.e., less than 5% by weight). An example of a low toxic organic solvent is acetic acid.

The solution, dispersion, or emulsion preferably has a pH less than 7, more preferably less than 5.

The Organic Compound

The organic compound desirably is selected to reduce the permeability of the coated structure (to optimize barrier improvement) and should include one or more functional groups capable of bonding or reacting with the epoxide additive. Suitable organic compounds should have at least one, and preferably a plurality of, hydroxyl, carboxyl, carboxamide, amine, or carbonyl functional groups. The organic compound can be polymeric, oligomeric, or monomeric.

Preferred organic compounds include polyvinyl alcohols and polyhydroxyaminoethers. In a particularly preferred embodiment, the organic compound is a polyhydroxyaminoether (i.e., a hydroxy functionalized epoxy resin), such as BLOX™ (The Dow Chemical Company, Midland, Mich., USA). BLOX 4000 Series Resins are particularly preferred, for their enhanced gas barrier properties. Examples of other suitable organic compounds include other polyetheramines and their salts, polyethyleneimines, polydextrose, polysaccharides, polyacrylic emulsions, emulsions, dispersions, and solutions of epoxy resins, urethane polymers, acrylic-urethanes, styrene-acrylic emulsions, and carboxy methyl cellulose.

Suitable organic compounds for forming the top coat are solid at temperature (25° C.) and pressure (atmospheric pressure). It is desirable that the organic compound for forming the top coat is non-toxic.

Although there are many solid/solvent combinations that are effective in the methods described herein, it is preferred that both the solid (i.e., the organic compound) and solvent be compatible with food and beverages. It is particularly preferred that both the solid and solvent have regulatory approval for use in food-contact applications. It is especially preferred to use water as the solvent (or dispersion or emulsion medium), due to its low cost, non-toxicity, and ease of handling.

The Epoxide Additive

The epoxide additive is a monofunctional or multifunctional epoxide that enhances the water resistance, adhesion, and/or gas barrier properties of the organic compound of the top coat. While not being bound by any theory, it is believed that the epoxide works by either crosslinking the top coat material, thereby increasing the water resistance and adhesion of the top coat, or by reacting with neutralization agents present in aqueous coating solutions, dispersions, or emulsions, or by a combination of these mechanisms. Examples of these neutralization agents include acids, such as phosphoric acid, that are used to stabilize certain coating compositions, such as a dispersion of BLOX. It is believed that monofunctional epoxides operate solely by the latter mechanism, to reduce the water affinity of the organic coating, and thus enhance the water resistance of the organic coating layer.

The epoxide additive preferably comprises a multifunctional epoxide, which is an epoxide with two or more functional epoxide groups. For example, in a preferred embodiment, the epoxide additive is a bi-functional epoxide. In another embodiment, a epoxide additive includes a di-epoxide mixed with a small amount of a tri-epoxide. The epoxide should be at least partially soluble, dispersible, or emusifiable in the organic compound or solvent of the coating emulsion, dispersion, or solution. The epoxide additive is believed to undergo a ring opening reaction with functional groups, such as amine or hydroxyl groups, of the organic compound in the coating solution, dispersion, or emulsion. This crosslinks the organic compound and forms a hard cross-linked polymer network, so that a tough film is formed when the coating is dried. The crosslinking reaction preferably is one that occurs to an appreciable extent at a low temperature, e.g., less than or equal to about 75° C.

The cross-linking provides the top coat barrier layer with good water resistance—both to water at ambient (e.g., 22° C.) and elevated temperatures (e.g., up to 45° C. or higher). The degree of water resistance can be adjusted depending on the application, for example, by altering the cross-linking density or the degree of cross-linking. This can be readily achieved by adjusting the ratio of the top coat organic compound (e.g., polymer) and the multifunctional epoxide additive, by adjusting the pH of the coating solution, dispersion, or emulsion, or by a combination of these approaches.

The cross-linked coating also can provide enhanced adhesion to the underlying substrate (e.g., PET), due to polar-polar attractions between the layers of materials. It is also possible to chemically react the epoxide to any available functional groups on the substrate surface, such as but not limited to, hydroxy and carboxyl functionality. The barrier performance of the polymeric structure is improved by the top coat barrier layer, and the extent of that improvement depends, in part, on the thickness of the top coat. Generally, the thicker the coating layer, the greater the barrier to vapor and gas. The barrier of the coated containers can be varied for a particular application by varying the thickness of the top coat.

Structures having the top coat are potentially recyclable, as the top coat is lightly cross-linked and can be removed from the underlying polymeric layer or inorganic oxide layer using conventional techniques, such as caustic hot water baths.

Preferred epoxide additives include resorcinol diglycidyl ether and glycerol diglycidyl ether. Other suitable epoxide additives include polymeric epoxides, diethyleneglycol diglycidyl ether, polyethyleneglycol diglycidyl ether, glycerol polyglycidyl ether, diglycerol polyglycidyl ether, 1,2-epoxy butane, polyglycerol polyglycidyl ether, isoprene diepoxide, and cycloaliphatic diepoxide. Other representative examples of epoxide additives include 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine, and diglycidyl ether of bisphenol A.

The epoxides of the epoxide additive can be water soluble or water insoluble. It can be solubilized as an emulsion or dispersion. Alternatively, it can be insoluble and dispersed in aqueous or nonaqueous liquids, emulsions, or combined with another dispersion in liquid.

The epoxide additive typically is added at a concentration of between 0.01 and 75 wt %, preferably between about 0.1 and 20 wt %, more preferably between about 0.5 and 7.5 wt %, based on the content of organic compound. In embodiments wherein the multi-functional epoxide additive is essentially insoluble or only marginally soluble in the liquid phase or emulsion or dispersion, then the lower limit is the solubility or saturation point in the coating mixture. The lowest usage limit of epoxide additives is the breakage of stability of epoxide in water either as solution or dispersion.

In preferred embodiments, the epoxide additive promotes adhesion between the organic coating layer and the base polymer layer. In preferred embodiments utilizing an inorganic oxide coating layer, the epoxide additive promotes adhesion between the organic coating layer and the inorganic oxide coating layer.

The Structure and Applying the Top Coat Thereto

The above described top coat compositions are useful in methods for enhancing the gas or vapor barrier properties of a monolithic polymeric structure having a polymeric base layer, or of a multilayer structure comprised of a polymeric base layer and an inorganic oxide gas barrier layer on a surface of the polymeric base layer.

In one embodiment, a container having a coated structure is made by the following steps: (i) providing a polymeric base layer, such as PET; (ii) applying to the base layer a solution, dispersion, or emulsion comprising the organic compound (barrier material) and an epoxide additive, to form a wet coating layer; and (iii) drying the wet coating layer to form a continuous, barrier enhancing top coat over and adhered to the polymeric base layer. In a preferred embodiment, the epoxide additive crosslinks with the organic compound.

In an alternative embodiment, a container having a multilayer structure is made by the following steps: (i) providing a polymeric base layer, such as PET; (ii) applying an inorganic gas barrier layer to the base polymer layer; (iii) applying to the inorganic gas barrier layer a solution, dispersion, or emulsion comprising the organic compound with epoxide additive to form a wet coating layer; and (iv) drying the wet coating layer and allowing the epoxide additive to crosslink with the organic compound to form a continuous, barrier enhancing top coat over and adhered to the inorganic gas barrier layer. In a preferred embodiment, the epoxide additive crosslinks with the organic compound.

In either approach, the steps, individually and in combination, can be conducted batchwise or in a continuous or semi-continuous process.

Polymeric Base Layer

The polymeric base layer preferably is a thermoplastic. Polyesters are particularly suitable, with polyethylene terephthalate (PET) being preferred for beverage packaging. Other suitable polyesters include polyethylene naphthalate (PEN), PET/PEN blends, PET copolymers, and the like. The base layer can be in the form of a flexible or rigid film or container. The coating compositions and methods described herein are most effective on substantially rigid containers, such as bottles.

Inorganic Barrier Layer

The optional inorganic gas barrier layer can be composed of silicon, silica, a metal (e.g., aluminum, Al), a metal oxide, or combination thereof. Silica ($SiO_x$) is particularly desirable for beverage containers because it is transparent, chemically inert, and compatible with food and beverages. The inorganic gas barrier layer preferably has a thickness between about 1 and about 100 nm.

The inorganic barrier coating can be applied to the polymeric base layer by a number of techniques. Examples of these techniques include sputtering and various types of vapor deposition, such as plasma vapor deposition, plasma enhanced chemical vapor deposition, and electron beam or anodic arc evaporative vapor deposition. Suitable vapor deposition techniques are described in U.S. Pat. No. 6,279,505 to Plester, et al., and U.S. Pat. No. 6,251,233, the disclosures of which are hereby expressly incorporated herein by reference. Alternatively, application of the inorganic oxide gas barrier layer can be conducted using a sol-gel process.

The Barrier Enhancing Top Coat

The top coat is applied to the inorganic barrier layer or polymer base layer to enhance the vapor or gas barrier of the structure. The top coat can be applied by dissolving the soluble organic compound in water or another suitable solvent, or by dispersing or emulsifying the organic compound in water or another liquid medium, and then applying the solution, dispersion, or emulsion to the inorganic barrier layer or polymer base layer using one of a variety of techniques known in the art. Examples of these coating techniques include dipping, flowing, or spraying. The application step may be followed by an optional step, such as spinning the coated bottle, to remove excess coating material, if needed. Application of the top coat preferably includes this spinning step. Following application of the solution, dispersion, or emulsion, the epoxide additive reacts (e.g., crosslinks the organic compound, reacts with a neutralization agent) and the structure is allowed to dry such that the solvent evaporates, causing the organic compound to precipitate and/or coalesce and form a film. In an embodiment having the optional inorganic oxide layer, when the solvent evaporates, the organic compound remains in the pinholes of the inorganic oxide barrier layer to block ingress or egress of gas or vapor. Preferably, the wet top coat is dried and crosslinked at a temperature less than or equal to about 75° C. (e.g., less than 60° C., less than 50° C., less than 40° C., less than 30° C., less than 25° C.). This low drying temperature (e.g., less than or equal to about 75° C.) is important because the polymeric base layer may shrink or deform when exposed to higher temperatures for an extended period of time, particularly for the preferred polymeric materials, and will cause the inorganic oxide coating layer, if present, to crack.

The thickness of the top coat may vary and can be very thin. Some top coats can be applied at a thickness of 50 microns or less and some can be applied at a thickness of 10 microns or less. Desirably, the top coat has a thickness of less than 5 microns. It should be understood, however, that the thickness of the top coat can be greater than 50 microns. The particular thickness of the top coat will be selected, in part, based on the required barrier of the coated structure, as well as any barrier provided by other layers of the structure, e.g., whether an inorganic oxide layer is interposed between the top coat barrier layer and the polymeric bas layer.

Forms and Uses of the Multilayer Structures

The top coat coatings and methods are particularly useful for enhancing the gas or vapor barrier characteristics of containers such as food or beverage containers. The coatings and methods are particularly useful for enhancing the gas or vapor barrier characteristics of packaged food and beverage containers. The compositions and methods described herein preferably are used to form a coated plastic container comprising a plastic container body having an external surface and a coating on the external surface of the container. The coating provides a barrier that inhibits the flow of gas into and out of the container, which is particularly useful in producing carbonated beverages. For example, the gas barrier coating can protect the beverage from the flow of oxygen into the container from the outside or can inhibit the flow of carbon dioxide out of the beverage container. The resulting carbonated beverage has a longer shelf life because the coating on the container better holds the carbon dioxide within the container.

In the manufacture of packaged beverages, the top coat described herein can be applied to containers in a continuous packaged beverage manufacturing line between application of the inorganic oxide barrier layer to the container and filling the container with the beverage. Alternatively, the top coat possibly could be applied to the containers after they are filled with beverage. Regardless, the containers treated in accordance with these compositions and methods described herein can be used to manufacture packaged beverages in a conventional packaged beverage manufacturing facility. Such beverages desirably may be a carbonated beverage, such as a soft drink, beer, or sparkling water; or a non-carbonated beverage, such as a juice-containing beverage or still water.

It is also envisioned that containers having the structure described herein would be useful for packaging oxygen-sensitive products, such as foods and beverages. For example, the enhanced barrier would reduce the flow of atmospheric oxygen into the container, thereby extending the shelf-life of an oxygen-sensitive product containing therein.

For embodiments having the underlying structure with the optional inorganic oxide barrier layer, a further benefit of the top coat compositions is that, in addition to enhancing the barrier properties of such structures, the top coat provides a method to increase the abuse resistance of such structures. Specifically, if film-forming polymeric materials are used as the organic compound, then deposition of those polymers onto the surface of the inorganic oxide layer can increase the abuse resistance of that layer. This is particularly useful in manufacturing packaged beverages because of the necessary mechanical handling of the treated containers.

Figure 1:
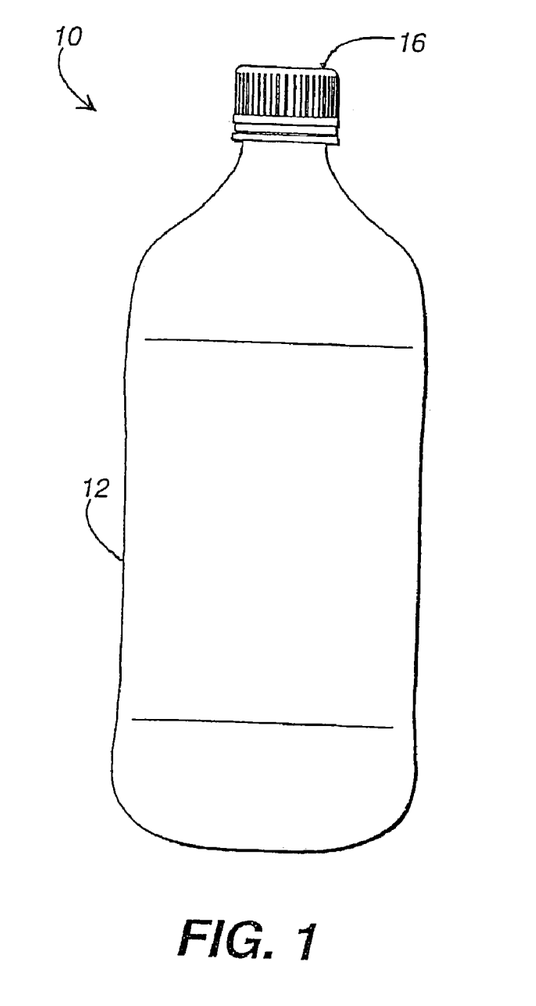
FIG. 1 is an elevation view of a packaged beverage including a container coated with a gas or vapor barrier top coat in accordance with an embodiment of this invention.
Figure 2:
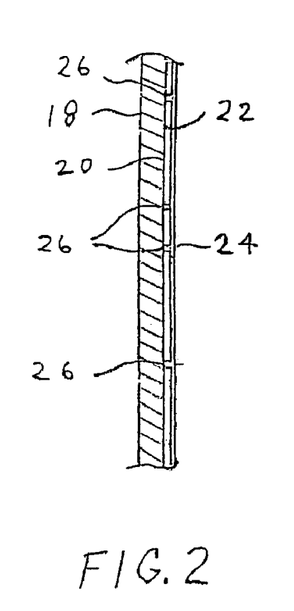
FIG. 2 is a partial sectional view of the container in FIG. 1 illustrating the multilayer structure of the container.

FIG. 1 illustrates a packaged beverage 10 comprising a container body 12, a beverage (not shown) disposed in the container, and a closure or cap 16 sealing the beverage within the container body. FIG. 2 illustrates the multiple layers of the container body including the polymeric base layer 18, the inorganic oxide gas or vapor barrier layer 20 on the exterior surface 22 of the base layer, and a vapor or gas barrier enhancing top coat 24 on the inorganic oxide barrier layer. Suitable polymers for forming the polymeric base layer 14 of the multilayer structure container 12 can be any thermoplastic polymer suitable for making containers, but preferably is PET. The inorganic oxide barrier layer 20 reduces the permeability of the container 10 to gas and vapor, particularly carbon dioxide and oxygen. The inorganic oxide barrier layer 20 suitably comprises a silica. The top coat 24, which includes an epoxide crosslinked with an organic compound, preferably a polymer, is applied so as to enhance the vapor or gas barrier of the multilayer structure container 12. The top coat 24 illustrated in the FIG. 2 is continuous on the surface of the inorganic oxide barrier coating, but can be discontinuous. The top coat 24 fills the pinholes 26 in the inorganic oxide gas barrier layer and reduces the permeability of the container 12 to gas or vapor.

In a preferred variation (not shown) of the structure illustrated in FIG. 2, the inorganic oxide barrier layer 20 is omitted, and the top coat barrier layer 24 is coated directly onto polymeric base layer 18.

The present invention will be further understood with reference to the following non-limiting examples.

EXAMPLES

In the following examples, PET bottles were subjected to various treatments that demonstrate the barrier-enhancing effect of the present compositions and methods. Barrier improvement and water resistance of the coating were assessed.

The barrier improvement factor (BIF) was determined by comparing the loss rates for containers with different coating compositions and layer structures. For example, the BIF of a plain, uncoated PET bottle is 1. Assuming the shelf life of a carbonated beverage packaged in a plain, uncoated PET bottle is about 10 weeks, the shelf life of a carbonated beverage in a coated PET bottle having a BIF of 1.2 would be about 12 weeks, the shelf life of a carbonated beverage in a coated PET bottle having a BIF of 2 would be about 20 weeks, and the shelf life of a carbonated beverage in a coated PET bottle having a BIF of 20 would be about 200 weeks. BIF can be measured using empty bottles with GMS (Gebele Measurement System) at 38° C. In these examples, the $CO_2$ loss rate was measured by determining the rate that $CO_2$ migrated to the exterior of the bottle, when the bottles were pressurized to 5 bar pressure and held at 38° C.

Water resistance was determined by a variety of tests. Unless otherwise indicated in the individual examples described below, water resistance was measured by immersing the top coated bottles in ambient temperature (e.g., 22° C.) water for 24 hours, either 5 minute or 24 hours after the top coat was applied. The bottles then were rubbed continuously with firm finger pressure while immersed during the first 5 minutes of immersion. The appearance and feel of the coating was then observed. It was also determined whether any coating particles had dissolved into the water by, first, visually inspecting the water and bottle under light, and then comparing the weight of the coated bottles before and after the water resistance test. For example, when BLOX™ was used as the top coat, a white haze was observed in the water if the coating dissolved into the water. These tests were repeated every hour for the first five hours, and then again 24 hours after immersion. The top coat was considered water resistant (i.e., the coating passes the water resistance test) when (i) no coating can be rubbed off and no coating dissolves into the water following 24 hour immersion in water at 22° C., and (ii) the coating of the bottles, while in the water, do not feel sticky.

Example 1

Water Resistance of PET Bottles Coated with BLOX™ and Resorcinol Diglycidyl Ether Resorcinol diglycidyl ether ("RDGE"), which is one of the monomer components of BLOX™ and is sparsely soluble/dispersible in a dispersion of BLOX™, was used as a multifunctional epoxide additive. After 4 hours of mixing the 1.5 wt % of RDGE and 20 wt % of BLOX™ water dispersion (i.e., 98.5 wt % BLOX dispersion consisting of 20.0 wt % polymer solids and the balance water) at PH less than 5, PET bottles were coated by pouring the mixture on the bottles while the bottles were rotating, and then spinning off the excess materials from the bottles and dried at 60° C. for two minutes in a temperature-controlled oven. The coating thickness achieved in this manner was around 1.5 to 2.0 μm. The bottles were then tested for water resistance (WR). The coated bottles passed all of the WR tests.

Example 2

Removability of BLOX™ and Resorcinol Diglycidyl Ether Coating from PTE Bottles

Bottles coated as described in Example 1 were placed into a caustic solution (pH 12) at 85° C. to simulate PET recycle conditions. A stirrer was used to lightly rub the bottle surface in the caustic solution. The coatings were easily peeled off from the PET bottle, and in some cases dissolved within about five minutes of immersion into the hot caustic solution. These results indicate that the coating has good potential for commercial recycling.

Example 3

Water Resistance of PET Bottles Coated with BLOX™ and Glycerol Diglycidyl Ether

Glycerol diglycidyl ether ("GDE"), another multifunctional epoxide additive, was mixed and reacted with BLOX™. After one day of mixing 1.5 wt % of GDE and 20 wt % of BLOX™ water dispersion at PH less than 5, PET bottles were coated, spun, and dried as described in Example 1. The coating thickness achieved was around 1.5 to 2.0 μm. The coated bottles then were subjected to, and passed, all WR tests.

Example 4

Water Resistance of PET Bottles Coated with BLOX™ and Resorcinol Diglycidyl Ether PET bottles were coated with a mixture of BLOX™ and RGDE as described in Example 1, but in this experiment were dried with hot blown air. In particular, two hair dryers were positioned about 20 cm from the bottles and air at a temperature of about 66° C. was blown across the bottles for one minute. The coating thickness achieved in this manner was around 1.5 to 2.0 pm. The bottles were then tested for water resistance (WR) using either ambient water or hot water. The coated bottles passed all of the WR tests.

Example 5

Comparative Example—BLOX™ Coating on PET Bottles with No Epoxide Additive

A BLOX™ dispersion without any additives was coated onto PET bottles and dried either at 60° C. for 2 minutes in a temperature controlled oven or with hot air at 66° C. A coating thickness of around 1.5 to 2.0 μm was achieved in both cases. The bottles were then tested for water resistance (WR). The coated bottles failed by dissolving in water, irrespective of the drying method used.

Example 6

Water Resistance of $SiO_x$-Coated PET Bottles Topcoated with BLOX™ and Resorcinol Diglycidyl Ether PET bottles were made and coated with a thin layer of an inorganic oxide, $SiO_x$. The $SiO_x$-coated PET bottles were then coated with a top coat material of a BLOX™ and RDGE dispersion, using the process described in Example 1. A coating thickness of around 1.5 to 2.0 μm was achieved. The multilayer-coated bottles then were subjected to, and passed, all WR tests.

Example 7

Removability of BLOX™ and Resorcinol Diglycidyl Ether Coating from $SiO_x$-Coated PTE Bottles Bottles coated as described in Example 6 were placed into a caustic solution (pH 12) at 85° C. to simulate PET recycle conditions. A stirrer was used to lightly rub the bottle surface in the caustic solution. The coatings were easily peeled off from the $SiO_x$-coated PET bottle, and in some cases dissolved within about five minutes of immersion into the hot caustic solution. These results indicate that the coating has good potential for commercial recycling.

Example 8

Water Resistance of $SiO_x$-Coated PET Bottles Coated with BLOX™ and Glycerol Diglycidyl Ether PET bottles were made and coated with a thin layer of an inorganic oxide, $SiO_x$. The $SiO_x$-coated PET bottles were then coated with a top coat material of a BLOX™ and GDE dispersion, using the process described in Example 3. A coating thickness of around 1.5 to 2.0 μm was achieved. The multilayer-coated bottles then were subjected to, and passed, all WR tests.

Example 9

Water Resistance of $SiO_x$-Coated PET Bottles Coated with BLOX™ and Resorcinol Diglycidyl Ether PET bottles were made and coated with a thin layer of an inorganic oxide, $SiO_x$. The $SiO_x$-coated PET bottles were then coated with a top coat material of a BLOX™ and RGDE dispersion, using the process described in Example 4. A coating thickness of around 1.5 to 2.0 μm was achieved. The multilayer-coated bottles were then tested for water resistance using either ambient water or hot water, passing all tests.

Example 10

Comparative Example—BLOX™ Coating on $SiO_x$-Coated PET Bottles with No Epoxide Additive A BLOX™ dispersion without any additives was coated onto $SiO_x$-coated PET bottles and dried either at 60° C. for 2 minutes in a temperature controlled oven or with hot air at 66° C. A coating thickness of around 1.5 to 2.0 μm was achieved. The bottles were then tested for water resistance; they failed, as the top coating dissolved in water, irrespective of the drying method used.

Example 11

Water Resistance of SiO$_x$-Coated PET Bottles Coated with BLOX™ and 1,2-Epoxy Butane

PET bottles were made and coated with a thin layer of an inorganic oxide, SiO$_x$. A dispersion of 1.5 wt % of 1,2-epoxy butane, a monofunctional epoxide additive, and 20 wt % of BLOX™ in water (i.e., 98.5 wt % BLOX dispersion consisting of 20.0 wt % polymer solids and the balance water) was prepared and then coated onto SiO$_x$-coated PET bottles by pouring the mixture on the bottles while the bottles were rotating, spinning excess materials off the bottles, and then drying the BLOX/SiOx-coated bottles at about 66° C. A coating thickness of around 1.5 to 2.0 μm was achieved. The multilayer-coated bottles then were subjected to, and passed, all WR tests.

Example 12

Comparative Example—Water Resistance of SiO$_x$-Coated PET Bottles Coated with Acetic Acid-Containing BLOX™ Dispersion and No Epoxide Additive

PET bottles were made and coated with a thin layer of an inorganic oxide, SiO$_x$. A milky white dispersion containing 0.5 wt % acetic acid, plus another mineral acid, and 20 wt % BLOX™ was prepared. Then, the SiO$_x$-coated PET bottles were coated with the dispersion by dip coating them in the dispersion, draining and then spinning them to remove excess coating. The bottles were then dried in a forced air oven at 60° C. for two minutes. A coating thickness of around 1.5 to 2.0 μm was achieved. Five minutes later, the coated bottles were immersed in room temperature water for 15 minutes and rubbed as in the water resistance test described in Example 1.

Next, the bottles were subjected to a harsher adhesion test to determine if a freshly coated bottle can retain the coating in water at an elevated temperature. The bottles were immersed in water at 45° C. It was observed that the coating came off, as evidenced by the water turning cloudy.

Example 13

Water Resistance of SiO$_x$-Coated PET Bottles Coated with Acetic Acid-Containing BLOX™ Solution and Resorcinol Diglycidyl Ether

PET bottles were made and coated with a thin layer of an inorganic oxide, SiO$_x$. A viscous solution containing 4 wt % acetic acid and 20 wt % BLOX™ was prepared, and, due the viscosity, diluted to 3–8 wt % BLOX before use. A coating mixture was prepared from the diluted solution (98.5 wt %) and resorcinol diglycidyl ether (RDGE) (1.5 wt %). Then, the SiO$_x$-coated PET bottles were coated with the coating mixture by dip coating them in the mixture, draining and then spinning them to remove excess coating. The bottles were then dried. A coating thickness of around 1.5 to 2.0 μm was achieved. Water resistance tested were conducted on the bottles as described in Example 12. It was observed that the coating remained on the bottle, as evidenced by no clouding of the 45° C. water.

Example 14

Water Resistance of SiO$_x$-Coated PET Bottles Coated with Acetic Acid-Containing BLOX™ Solution and Sorbitol Polyglycidyl Ether

SiO$_x$-coated PET bottles were made and top coated as described in Example 12; however, sorbitol polyglycidyl ether (SPGE) (1.5 wt %) rather than RDGE was used as the epoxide additive. The coating was 8.0 wt % BLOX. A coating thickness of around 1.5 to 2.0 μm was achieved. The top coated bottles were subjected to, and passed, the water resistance tests described in Example 12.

Example 15

Water Resistance of SiO$_x$-Coated PET Bottles Coated with Acetic Acid-Containing BLOX™ Solution and Diglycidyl Ether of Bisphenol A

SiO$_x$-coated PET bottles were made and top coated as described in Example 12; however, a 65 wt % dispersion of diglycidyl ether of bisphenol A (DGEBA) (2.3 wt %) rather than RDGE was used as the epoxide additive. The coating was 8.0 wt % BLOX. A coating thickness of around 1.5 to 2.0 μm was achieved. The top coated bottles were subjected to, and passed, the water resistance tests described in Example 12.

Example 16

Water Resistance of SiO$_x$-Coated PET Bottles Coated with Acetic Acid-Containing BLOX™ Solution and 1,4-Butanediol Diglycidyl Ether

SiO$_x$-coated PET bottles were made and top coated as described in Example 12; however, 1,4-butanediol diglycidyl ether (BDGE) (1.5 wt %) rather than RDGE was used as the epoxide additive. The coating was 8.0 wt % BLOX. A coating thickness of around 1.5 to 2.0 μm was achieved. The top coated bottles were subjected to, and passed, the water resistance tests described in Example 12.

Example 17

Water Resistance of SiO$_x$-Coated PET Bottles Coated with Acetic Acid-Containing BLOX™ Solution and Glycerol Diglycidyl Ether (1.2%)

SiO$_x$-coated PET bottles were made and top coated as described in Example 12; however, glycerol diglycidyl ether (GDE) (1.2 wt %) rather than RDGE was used as the epoxide additive. The coating was 6.0 wt % BLOX. A coating thickness of around 1.5 to 2.0 μm was achieved. The top coated bottles were subjected to, and passed, the water resistance tests described in Example 12.

Example 18

Water Resistance of SiO$_x$-Coated PET Bottles Coated with Acetic Acid-Containing BLOX™ Solution and Glycerol Diglycidyl Ether (0.6%)

SiO$_x$-coated PET bottles were made and top coated as described in Example 12; however, GDE (0.6 wt %) rather than RDGE was used as the epoxide additive. The coating was 3.0 wt % BLOX. A coating thickness of around 1.5 to 2.0 μm was achieved. The top coated bottles were subjected to, and passed, the water resistance tests described in Example 12.

Example 19

Water Resistance of SiO$_x$-Coated PET Bottles Coated with Acetic Acid-Containing BLOX™ Solution and Tetra Glycidyl Ether of Meta-Xylenediamine

SiO$_x$-coated PET bottles were made and top coated as described in Example 12; however, tetra glycidyl ether of meta-xylenediamine (GEX) (1.5 wt %) rather than RDGE was used as the epoxide additive. The coating was 8.0 wt % BLOX. A coating thickness of around 1.5 to 2.0 μm was achieved. The top coated bottles were subjected to, and passed, the water resistance tests described in Example 12.

Example 20

Barrier Improvement of PET Bottles Coated with BLOX™ with and without Epoxide Additive

PET bottles were prepared and coated with a BLOX top coat (20%) containing a resorcinol diglycidyl ether additive, a glycerol diglycidyl ether additive, or no additive. A coating thickness of around 1.5 to 2.0 μm was achieved. The bottles were then tested for barrier improvement factor (BIF) relative to uncoated PET bottles. The results are shown in Table 1.

TABLE 1

BIF Comparison of Various Coating Structures

| Bottle Structure | BIF |
|---|---|
| PET | 1 |
| PET + 20% BLOX ™ (1.7 μm thick) | 1.91 |
| PET + 20% BLOX ™ + 1.5% resorcinol diglycidyl ether | 1.96 |
| PET + 20% BLOX ™ + 1.5% glycerol diglycidyl ether (about 3 microns thick) | 2.03 |

For comparison purposes, BIF values were calculated for the PET bottles having other layer thicknesses of BLOX™ coating. These structures and BIF values are shown in Table 2.

TABLE 2

BIF Comparison of Various BLOX ™ Coatings

| Bottle Structure | BIF |
|---|---|
| PET (28 g bottle) | 1 |
| PET + 1.75 micron BLOX ™ | 1.91 |
| PET + 2.5 micron BLOX ™ | 2.1 |
| PET + 3 micron BLOX ™ | 2.3 |
| PET + 4 micron BLOX ™ | 2.7 |
| PET + 5 micron BLOX ™ | 3.1 |

Example 21

Barrier Improvement of SiO$_x$-Coated PET Bottles Coated with BLOX™ with and without Epoxide Additive

SiO$_x$-coated PET bottles were prepared and top coated with a BLOX™ top coat (20%) containing a resorcinol diglycidyl ether (RDGE) additive, a glycerol diglycidyl ether (GDE) additive, or no additive. The bottles were coated as in Example 6, and a coating thickness of around 1.5 to 2.0 μm was achieved. The bottles were then tested for barrier improvement factor (BIF) relative to non-top coated, SiO$_x$-coated PET bottles. The results are shown in Table 3.

TABLE 3

BIF Comparison of Various Coating Structures

| Bottle Structure | BIF |
|---|---|
| SiO$_x$-Coated PET | 1.76 |
| SiO$_x$-Coated PET + 20% BLOX ™ | 6.63 |
| SiO$_x$-Coated PET + 20% BLOX ™ + 1.5% GDE | 6.63 |
| SiO$_x$-Coated PET + 20% BLOX ™ + 1.5% RDGE | 6.81 |

These results of these Examples indicate that the inclusion of an epoxide additive in the organic top coat can enhance the water resistance and adhesion of the organic top coat while improving the overall BIF of containers therewith, as compared with bottles having organic barrier coatings alone or with bottles having organic barrier coatings in combination with inorganic barrier coatings. The epoxide additive has been shown to effect the combination of improvements.

Those skilled in the art will recognize, or be able to ascertain using no more than routine experimentation, many equivalents to the specific embodiments of the invention described herein. The references cited herein are hereby incorporated by reference.

We claim:

1. A coated structure comprising:
    a thermoplastic polymeric base layer;
    an inorganic gas barrier layer on the polymeric base layer; and
    a top coat barrier layer coated on the inorganic gas layer, the top coat barrier layer comprising an organic compound capable of reducing the permeability of the structure to gas or vapor, and an epoxide additive which enhances the water resistance, adhesion, gas barrier, or a combination thereof, of the top coat barrier layer,
    wherein the organic compound is selected from the group consisting of polyhydroxyaminoethers, polyetheramines, polyetheramine salts, polyacrylics, and carboxy methylcellulose.

2. The structure of claim 1 wherein the organic compound and epoxide additive are applied to the polymeric base layer in an aqueous solution, dispersion, or emulsion, which is then dried to form the top coat barrier layer.

3. The structure of claim 2, wherein the solution, dispersion, or emulsion is at least substantially free of volatile organic solvents and halogen compounds.

4. The structure of claim 2, wherein the solution, dispersion, or emulsion comprises less than 7.5% of epoxide additive by weight of organic compound.

5. The structure of claim 1, wherein the epoxide additive comprises a multifunctional epoxide which crosslinks the organic compound.

6. The structure of claim 2, wherein the epoxide additive comprises a monofunctional epoxide which reacts with a neutralization agent in the aqueous solution, dispersion, or emulsion.

7. The structure of claim 1, wherein the epoxide additive provides adhesion promotion between the top coat barrier layer and the polymeric base layer.

8. The structure of claim 1, wherein the epoxide additive comprises resorcinol diglycidyl ether or glycerol diglycidyl ether.

9. The structure of claim 1, wherein the organic compound has at least one hydroxyl, carboxyl, amine, or carbonyl functional group.

10. The structure of claim 1, wherein the organic compound is polymeric.

11. The structure of claim 1, wherein the organic compound is selected from the group consisting of polyetheramines, poly(acrylamide)s, poly(acrylic acid)s, and carboxymethyl celluloses.

12. The structure of claim 1, wherein the organic compound comprises a polyhydroxyaminoether.

13. The structure of claim 1, wherein the top coat barrier layer has a thickness of less than 10 microns.

14. The structure of claim 13, wherein the top coat barrier layer has a thickness of less than 5 microns.

15. The structure of claim 1, wherein the inorganic gas barrier layer has pinholes and the top coat barrier layer is at least partially disposed in the pinholes.

16. The structure of claim 1, wherein the inorganic gas barrier layer comprises a coating of silicon, aluminum, $SiO_x$, or a combination thereof.

17. The structure of claim 1, wherein the epoxide additive provides adhesion promotion between the top coat barrier layer and the inorganic gas barrier layer.

18. The structure of claim 1, wherein the thermoplastic polymer comprises a polyethylene terephthalate.

19. The structure of claim 1, wherein the coated structure comprises a container.

20. The structure of claim 19, wherein the base layer is a container body and the top coat barrier layer is on an exterior surface of the container body.

21. A packaged beverage comprising a beverage disposed in the container body of claim 20.

22. A method for reducing the permeability of vapor or gas through a structure comprising a rigid polymeric base layer, the method comprising:
   coating the rigid polymeric base layer with an inorganic oxide layer;
   applying to the inorganic oxide layer a solution, dispersion, or emulsion, which comprises (i) an organic compound capable of reducing the permeability of the structure to gas or vapor, and (ii) an epoxide additive, to form a wet coating, wherein the solution, dispersion, or emulsion is aqueous; and
   drying the wet coating to form a top coat barrier layer on the structure, wherein the epoxide additive enhances the water resistance, adhesion, gas barrier, or a combination thereof, of the top coat barrier layer.

23. The method of claim 22, wherein the solution, dispersion, or emulsion is at least substantially free of volatile organic solvents and halogen compounds.

24. The method of claim 22, wherein the epoxide additive comprises a multifunctional epoxide which crosslinks with the organic compound following application of the wet coating.

25. The method of claim 22, wherein the epoxide additive comprises a monofunctional epoxide which reacts with a neutralization agent in the aqueous solution, dispersion, or emulsion.

26. The method of claim 22, wherein the drying is conducted at a temperature less than or equal to about 66° C.

27. The method of claim 22, wherein the structure is a container.

28. The method of claim 27, wherein the base layer is in the form of a container body, and the top coat barrier layer is applied to an exterior surface of the container body.

29. The coated structure of claim 1, wherein the inorganic gas barrier layer comprises silicon, silica, a metal oxide, or a combination thereof.

30. The coated structure of claim 1, wherein the polymeric base layer is rigid container.

31. The method of claim 22, wherein the rigid polymeric base layer is a bottle.

32. A polymeric container for packaging a beverage comprising:
   a bottle having a polyester base layer;
   an inorganic gas barrier layer deposited on the base layer; and
   a top coat barrier layer coated on the inorganic gas layer, wherein the top coat barrier layer comprises a polyhydroxyaminoether, which is cross-linked by a multifunctional epoxide additive which enhances the water resistance, adhesion, gas barrier, or a combination thereof, of the top coat barrier layer.

33. The container of claim 32, wherein the bottle is formed of polyethylene terephthalate.

34. The container of claim 33, wherein the inorganic barrier layer comprises silica.

* * * * *